United States Patent [19]

Ebert et al.

[11] Patent Number: 5,265,826

[45] Date of Patent: Nov. 30, 1993

[54] HELICOPTER ENGINE CONTROL HAVING LATERAL CYCLIC PITCH ANTICIPATION

[75] Inventors: Frederick J. Ebert, Westport; Joseph T. Driscoll, Cheshire; Byron Graham, Jr., Easton, all of Conn.; David H. Sweet, Tequesta, Fla.

[73] Assignee: United Technologies Corporation, Hartford, Conn.

[21] Appl. No.: 935,764

[22] Filed: Aug. 26, 1992

Related U.S. Application Data

[63] Continuation-in-part of Ser. No. 750,390, Aug. 27, 1991, abandoned.

[51] Int. Cl.⁵ ................. B64C 11/34; B64C 27/57; G05D 1/08
[52] U.S. Cl. ................. 244/17.13; 244/182; 364/434
[58] Field of Search .......... 244/17.13, 17.19, 17.21, 244/182, 184, 195; 416/30; 364/431.07, 433, 434

[56] References Cited

U.S. PATENT DOCUMENTS

| | | | |
|---|---|---|---|
| 4,488,236 | 12/1984 | Morrison et al. | 244/182 |
| 4,493,465 | 1/1985 | Howlett et al. | 244/17.13 |
| 4,807,129 | 2/1989 | Perks | 244/17.13 |
| 4,912,642 | 3/1990 | Larsen et al. | 244/182 |
| 4,947,334 | 8/1990 | Massey et al. | 364/434 |
| 4,998,202 | 3/1991 | Walsh et al. | 244/182 |

FOREIGN PATENT DOCUMENTS

0398839 11/1990 European Pat. Off. .
2144244 2/1985 United Kingdom ............. 244/17.13

Primary Examiner—Michael S. Huppert
Assistant Examiner—Virna Lissi Ansley
Attorney, Agent, or Firm—Michael Grillo

[57] ABSTRACT

A helicopter engine fuel control anticipates changes in main rotor torque in response to lateral cyclic pitch commands, to thereby minimize engine and main rotor speed droop and overspeed during left and right roll maneuvers. A fuel compensation signal (100,101) is summed with a helicopter fuel control (52) fuel command signal (67) in response both to a lateral cyclic pitch command signal (LCP) (107) from a pilot operated cyclic pitch control exceeding a left or right threshold magnitude (201,210) and a total lateral cyclic pitch command signal (TCP) (108) from a lateral cyclic pitch control system exceeding a left or right threshold magnitude (202,207,215,220). The magnitude of the fuel compensation signal is dependant upon the direction of TCP and LCP, e.g., left or right, and helicopter roll acceleration (115). Alternatively, the magnitude and duration of the fuel compensation signal is dependant upon the rate of change in commanded lateral cyclic pitch (107,400,407). A limiter (120) limits the magnitude of the fuel compensation signal. The fuel compensation signal is overridden (127,125,103) when it is increasing fuel flow (303) during rotor overspeed (128,301), and when it is decreasing fuel flow (311) if rotor acceleration (130,133) is negative (310) during rotor droop (128,301).

15 Claims, 7 Drawing Sheets fig.1

HELICOPTER ENGINE CONTROL HAVING LATERAL CYCLIC PITCH ANTICIPATION

The Government has rights in this invention pursuant to Contract No. DAAJ09-89-C-A002 awarded by the Department of the Army.

This application is a continuation-in-part of Application Ser. No. 07/750,390, filed Aug. 27, 1991 now abandoned.

TECHNICAL FIELD

This invention relates to helicopter fuel controls, and more particularly to a fuel control which anticipates both increases and decreases in main rotor speed in response to lateral cyclic pitch commands.

BACKGROUND OF THE INVENTION

In modern helicopters, the trend towards main rotor systems which have low inertia reduces the amount of stored energy in the rotor system and causes the rotor to be more susceptible to large transient speed excursions during certain flight maneuvers, e.g., while executing left or right roll maneuvers. Such main rotor speed excursions, working in conjunction with other flight characteristics of helicopters, may result in unbalanced torque causing the nose of the aircraft to deviate from the desired heading. This undesirable deviation in the aircraft heading may cause an increase in pilot workload, frequently at critical times, or saturation of the aircraft stability augmentation system, or both.

Typically, the helicopter main rotor and a tail rotor are driven by a common gear mechanism. The tail rotor primarily functions as a torque compensating device to counteract the torque effect of the main rotor. Secondarily, the tail rotor is a means for controlling the angular movement of the helicopter about its vertical (yaw) axis, thereby controlling the heading of the helicopter. It is common at low air speeds to utilize tail rotor yaw to control the heading of the aircraft; but at high speeds, it is common to employ roll to effect a turn, utilizing tail rotor yaw only to coordinate the turn.

It is well known in the art that a roll maneuver is performed by changing the direction of main rotor thrust, e.g., by changing the pitch of each main rotor blade individually as it rotates through one rotation cycle. The pilot operated control that accomplishes this change is known as the cyclic pitch stick. To effect a roll maneuver, the cyclic pitch stick is moved laterally to the left to accomplish a left roll maneuver and laterally to the right to accomplish a right roll maneuver. In modern helicopters, the cyclic stick may be responsive to the amount of force applied to the stick rather than the movement of the stick to input lateral cyclic command signals. Typically, the helicopter is provided with a lateral cyclic pitch control system which controls the roll axis of the helicopter during a roll maneuver and provides automatic coordinated turns by combining the desired amount of roll with a correct amount of yaw, as is well known in the art. Examples of systems that provide coordinated turns are U.S. Pat. Nos. 4,003,532, 4,067,517, 4,206,891 and 4,392,203. In an aircraft where automatic turn coordination is provided, control of the main rotor cyclic pitch is provided by both the pilot operated cyclic pitch stick and the lateral cyclic pitch control system.

During certain roll maneuvers, undesirable rotor speed excursions may occur. For example, during a high rate left lateral cyclic pitch command (for rotor systems which rotate counterclockwise), the main rotor exhibits a rise in torque during the left roll maneuver. Similarly, during a high rate right lateral cyclic pitch command, the main rotor exhibits a decrease in torque during the right roll maneuver. These torque variations continue until the rotor settles into a steady state (rate) condition. It is believed, though not completely understood, that gyroscopic forces together with air inflow and rotor wake are responsible for these torque changes.

The increased main rotor torque during a left roll maneuver, coupled with the sluggishness of the helicopter's automatic fuel compensation system, result in undesirable variations in main rotor speed and variations in the heading of the aircraft. Similarly, variations in main rotor speed and aircraft heading occur due to reduced main rotor torque during a right roll maneuver. In aircraft used for military purposes, a further negative effect of rotor speed and heading variations is reduced accuracy in weapons targeting.

DISCLOSURE OF THE INVENTION

Objects of the invention include provision of a helicopter engine fuel control which anticipates changes in main rotor torque in response to lateral cyclic pitch commands, to thereby minimize engine and main rotor speed droop and overspeed during left and right roll maneuvers.

According to the present invention, a helicopter engine fuel control comprises a fuel compensation signal generated in response to changes in the position of a pilot operated cyclic pitch control, the fuel compensation signal being summed with a primary fuel governor fuel flow signal to thereby control the fuel supplied to the helicopter's engine. According to a first aspect of the present invention, the magnitude of the fuel compensation signal is determined in response to the lateral position of the cyclic pitch control, a total cyclic pitch command and helicopter roll acceleration. According to a second aspect of the present invention, the magnitude of the fuel compensation is determined in response to the rate of change in the lateral position of the cyclic pitch control applied via a first order lag, the difference between rotor speed and rated engine speed, and airspeed.

In accordance with a first embodiment of the present invention, the engine fuel control prevents the fuel compensation signal from increasing fuel supplied to the helicopter's engine whenever main rotor speed exceeds a nominal governor speed, and prevents the fuel compensation signal from decreasing fuel supply to the helicopter's engine whenever main rotor speed is less than the nominal governor speed and main rotor acceleration is below a threshold magnitude. According to a second embodiment of the invention, the engine fuel control does not sum the fuel compensation signal with the primary fuel governor fuel flow signal during engine operation above rated speed if engine speed is increasing and the fuel compensation signal is adding fuel, or if the primary fuel governor is adequately returning engine speed to its rated speed; and during engine operation below rated speed if the fuel compensation signal is removing fuel.

In still further accord with the present invention, the magnitude of the fuel compensation signal is limited to thereby limit the increase or decrease in fuel supplied to the helicopter's engine by the fuel compensation signal, the lower limit being determined as a function of the rate of change in engine speed, a large negative fuel compensation signal being allowed if the engine is accelerating, and a proportionally smaller lower limit being used if engine speed is stable or decreasing.

The present invention provides a fuel compensation signal in response to pilot lateral cyclic pitch commands to thereby mitigate the effects of engine and rotor speed droop and overspeed during roll maneuvers. The signal is generated when the pilot inputs a lateral cyclic pitch command above a predetermined threshold magnitude so that fuel compensation is started immediately upon receiving the command rather than after the effects of the roll maneuver cause the primary fuel governor to compensate for changed fuel demand caused by the roll maneuver. Therefore, the fuel compensation signal anticipates the reaction of the primary fuel governor to the effects of the roll maneuver, and immediately begins compensation to minimize rotor droop or overspeed.

The present invention also provides for overriding of the fuel compensation signal when certain operating conditions are met. For example, during main rotor overspeed, the fuel compensation signal is prevented from increasing the fuel supplied to the helicopter's engine. Similarly, when main rotor speed is decreasing during main rotor droop, the fuel compensation signal is prevented from decreasing the fuel supplied to the helicopter's engine. In a second embodiment of the invention, override of the fuel compensation signal is provided during engine overspeed if engine speed is increasing and the fuel compensation signal is adding fuel, or if the primary fuel governor is adequately returning engine speed to its rated speed; and during engine droop if the fuel compensation signal is removing fuel. The override criteria in the second embodiment are dependant exclusively upon engine speed, and therefore can reside within the fuel control and not be dependent on aircraft originated signals such as main rotor speed.

The second embodiment also provides a feedback path for the lateral cyclic pitch command rate signal to thereby allow both the magnitude and the duration of the fuel compensation signal to be dependant upon the commanded roll rate. Therefore, if there is a large commanded roll rate of a short duration, the feedback path "stretches out" the fuel compensation signal for a period longer than would have occurred based on the roll command rate signal without feedback. Another important feature of the invention is that the magnitude of the fuel compensation signal is limited to thereby limit the amount of increase or decrease in fuel supplied to the helicopter's engine during a roll maneuver. The lower limit is determined as a function of the rate of change in engine speed (NFDF). If engine speed is increasing, a large negative fuel compensation signal is allowed, and if engine speed is stable or decreasing, a proportionally smaller lower limit is used. This prevents excessive rotor and engine droop from a steady engine speed condition caused by too large of a lower limit, and excess rotor and engine overspeed from an initial overspeed condition caused by too small of a lower limit.

The invention may be implemented in a variety of ways including analog, digital or computer controls and in a fashion, or with additional features incorporated therewith to provide a more sophisticated control. The invention is easily implemented using apparatus and techniques which are well known within the skill of the art in light of the specific teachings with respect thereto which follow hereinafter.

Other objects, features and advantages of the present invention, will become more apparent in light of the following detail description of exemplary embodiments thereof, as illustrated in the accompanying drawings.

BEST MODE FOR CARRYING OUT THE INVENTION

Figure 1:
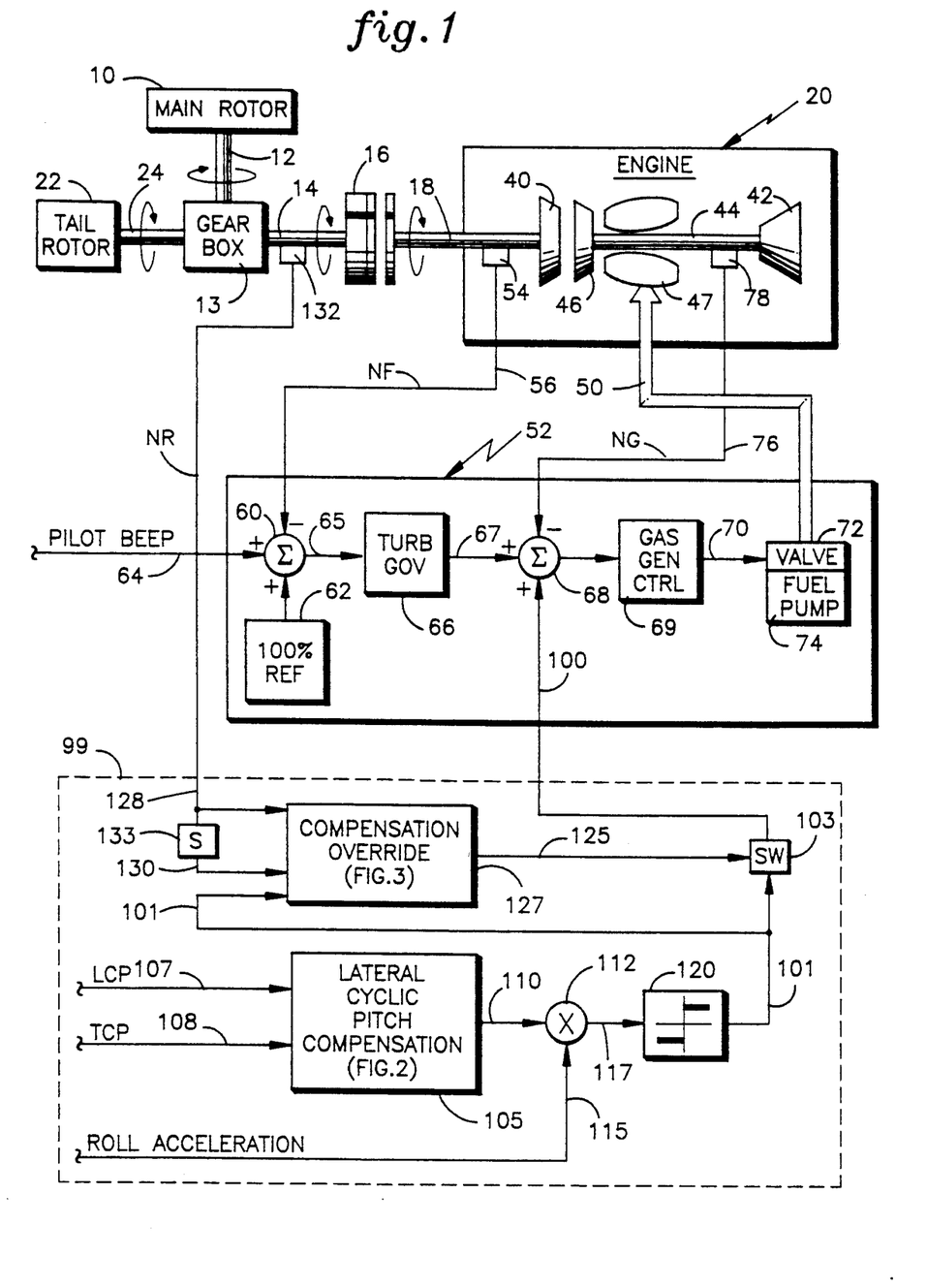
FIG. 1 is a simplified schematic block diagram of a helicopter rotor drive system in which the engine fuel control is responsive to lateral cyclic pitch commands in accordance with a first embodiment of the present invention.

The engine fuel control of the present invention is particularly well suited for anticipating changes in rotor torque in response to lateral cyclic pitch commands, thereby alleviating engine and main rotor speed droop and overspeed. Referring to FIG. 1, a main rotor 10 is connected through a shaft 12 to a gearbox 13 which is driven by a shaft 14 through an overrunning clutch 16, which engages an output shaft 18 of an engine 20 when the engine speed equals or exceeds the main rotor speed. The gearbox 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine engine in which the output shaft 18 is driven by a free turbine 40, which in turn is driven by gases from a gas generator including a turbo-compressor having a compressor 42 connected by a shaft 44 to a compressor driven turbine 46, and a burner section 47 to which fuel is applied by fuel lines 50 from an automatic fuel control 52 (primary fuel governor).

The fuel control 52 typically tries to provide the correct rates of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. Although the terms engine, free turbine and free turbine speed (NF) are used herein to describe the present invention, the terms power turbine and power turbine speed (NP) are also frequently used in the art, and could be used interchangeably herein when referring to the free turbine or engine.

The other inputs to the summing junction 60 comprise a reference speed signal, which typically is a reference value indicative of 100 percent rated speed derived from a source 62, together with any pilot desired variant therein as determined by a signal from a pilot's engine speed beeper on a line 64. The output of the summing junction 60 is a speed error signal on a line 65 which is applied to a turbine governor portion 66 of the fuel control, the output of which is a required gas generator signal on a line 67 which is fed to a summing junction 68 at the input of a gas generator control portion 69 of the fuel control. The gas generator control 69 provides a commanded fuel rate (fuel command signal) on a line 70 which is applied to a metering valve 72 so as to cause the correct amount of fuel from a fuel pump 74 to be applied to the fuel inlet lines 50. The summing junction 68 is also responsive to a signal indicative of gas generator speed (NG) on a line 76 which may be taken from a tachometer 78 responsive to the gas generator spool including the compressor 42, the shaft 44 and the turbine 46.

All of the apparatus described thus far is simply exemplary of that which is well known to the art.

In accordance with a first embodiment of the present invention, a lateral cyclic pitch anticipation portion 99 of the engine fuel control provides a fuel compensation signal (FCS) to the summing junction 68 on a signal line 100, which fuel compensation signal is generated in response to certain lateral cyclic pitch commands. The fuel compensation signal on the line 100 is provided from a line 101 via a normally closed switch 103. The operation of the switch 103 will be described herein in greater detail with respect to FIG. 3.

A lateral cyclic pitch compensation portion 105 of the fuel control is responsive to signals on lines 107 and 108, respectively indicative of a lateral cyclic pitch command signal (LCP), e.g., a signal indicative of the relative lateral position of a pilot operated cyclic pitch control stick, and a total lateral cyclic pitch command signal (TCP), e.g., a signal indicative of the total lateral cyclic pitch control signal provided by a helicopter lateral cyclic pitch control system of the type described herein before with respect to U.S. Pat. No. 4,392,203, entitled Aircraft Coordinated Turn With Lagged Roll Rate, the disclosure of which is incorporated herein by reference. The output of the compensation portion 105 is a gain signal (G) on a line 110 which is applied to a multiplier 112. Another input to the multiplier 112 is a roll acceleration signal, provided for example by a roll accelerometer or a differentiated roll rate gyro signal, on a line 115. The output of the multiplier 112 is applied on a line 117 to a limiter 120 which limits the magnitude of the fuel compensation signal supplied on the line 101.

Figure 2:
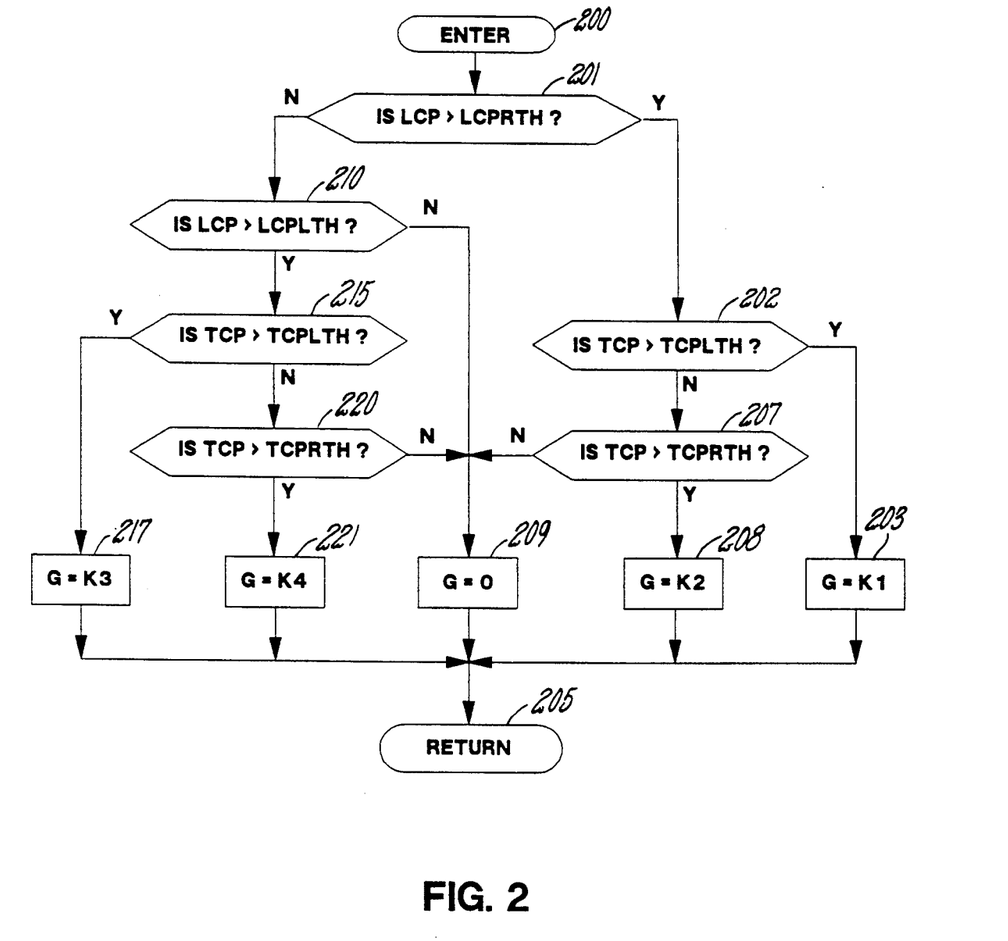
FIG. 2 is a simplified logic flow diagram of a routine for determining fuel compensation in response to lateral cyclic pitch commands in accordance with the embodiment of FIG. 1.

The gain on the line 110 provided by the compensation portion 105 may be determined very easily with a simple computer program of the type illustrated in FIG. 2 herein, such routine being performable digitally by means of a microprocessor (UPROC), or it may be incorporated as a simple program change within a digital, computerized automatic flight control system.

Referring to FIG. 2, the program is entered in a step 200, and the UPROC checks if LCP is greater than a threshold magnitude for a right lateral cyclic pitch command signal (LCPRTH) in a test 201. If the results of the test 201 are positive, the UPROC checks if TCP is greater than a threshold magnitude for a commanded left roll maneuver (TCPLTH) in a test 202. If the results of the test 202 are positive, the gain is set equal to K1 in a step 203. The subroutine then returns in a step 205. Therefore, the gain is set equal to K1 if the helicopter lateral cyclic pitch control system is currently commanding a left roll maneuver and the pilot inputs a right roll command, both signals being above respective threshold magnitudes. If the results of the best 202 are negative, the UPROC checks if TCP is greater than a threshold magnitude for a command right roll maneuver (TCPRTH) in a test 207. If the results of the test 207 are positive, the gain is set equal to K2 in a step 208. The subroutine then returns in the step 205. Therefore, the gain is set equal to K2 if the helicopter lateral cyclic pitch control system is currently commanding a right roll maneuver and the pilot inputs a right roll command, both signals being above respective threshold magnitudes. If the results of the tests 202 and 207 are negative, the lateral cyclic pitch control system is not providing a sufficiently large total lateral cyclic pitch command to warrant additional fuel compensation, and the gain is set equal to zero in a step 209. The subroutine then returns in the step 205.

If the results of the test 201 are negative, the UPROC checks if LCP is greater than a threshold magnitude for a left lateral cyclic pitch command signal (LCPLTH) in a test 210. If the results of the test 210 are negative, LCP is not above the left or right thresholds, and the gain is set equal to zero in the step 209. The subroutine then returns in the step 205. If the results of the test 210 are positive, the UPROC checks if TCP is greater than TCPLTH in a test 215. If the results of the test 215 are positive, the gain is set equal to K3 in a step 217. The subroutine then returns in the step 205. Therefore, the gain is set equal to K3 if the helicopter lateral cyclic pitch control system is currently commanding a left roll maneuver and the pilot inputs a left roll command, both signals being above respective threshold magnitudes.

If the results of the test 215 are negative, the UPROC checks if TCP is greater than TCPRTH in a test 220. If the results of the test 220 are positive, the gain is set equal to K4 in a step 221. The subroutine then returns in the step 205. Therefore, the gain is set equal to K4 if the helicopter lateral cyclic pitch control system is currently commanding a right roll maneuver and the pilot inputs a left roll command, both signals being above respective threshold magnitudes. If the results of the tests 215 and 220 are negative, the lateral cyclic pitch control system is not providing a sufficiently large total lateral cyclic pitch command to warrant additional fuel compensation, and the gain is set equal to zero in the step 209. The subroutine then returns in the step 205.

Therefore, the roll acceleration is multiplied by a gain signal, e.g. K1-K4 or zero, as determined by the direction and magnitude of a pilot lateral cyclic pitch command, and the direction and magnitude of the total cyclic pitch command provided by the automatic flight control system. Thereafter, the amplified roll acceleration signal is applied to a limiter 120, the output of which is a fuel compensation signal on the line 101. The gain signals, K1-K4, are selected so that the fuel compensation signal increases the fuel flow to the helicopter's engine during roll maneuvers which increase the torque on the helicopter rotor, e.g., a left roll maneuver for rotor systems which rotate counterclockwise. Additionally, the gain signals are selected so that the fuel compensation signal decreases the fuel flow to the helicopter's engine for roll maneuvers which lower the torque on the main rotor, e.g., a right roll maneuver for rotor systems which rotate counterclockwise.

Referring again to FIG. 1, the fuel compensation signal on the line 101 is provided through the normally closed switch 103 to the line 100 unless there is a signal on a line 125 to activate the switch 103 to an open position. The switch 103 may comprise a field-effect transistor (FET) or other transistor switch as is known in the art. The signal on the line 125 is provided by a compensation override portion 127 of the engine fuel control when certain conditions are met as described in greater detail hereinafter with respect to FIG. 3. The compensation override portion 127 is responsive to signals on lines 128 and 130, respectively indicative of rotor speed (NR) as determined from a tachometer 132 which may be responsive to the speed of the shaft 14 at the input to the gearbox 13, and the rate of change of rotor speed (NRDF) as determined by applying rotor speed on the line 128 to a differentiator 133, thereby providing a signal indicative of the rate of change of rotor speed (rotor acceleration) on the line 130. The compensation override portion 127 is also responsive to the fuel compensation signal on the line 101 from the output of the limiter 120.

Figure 3:
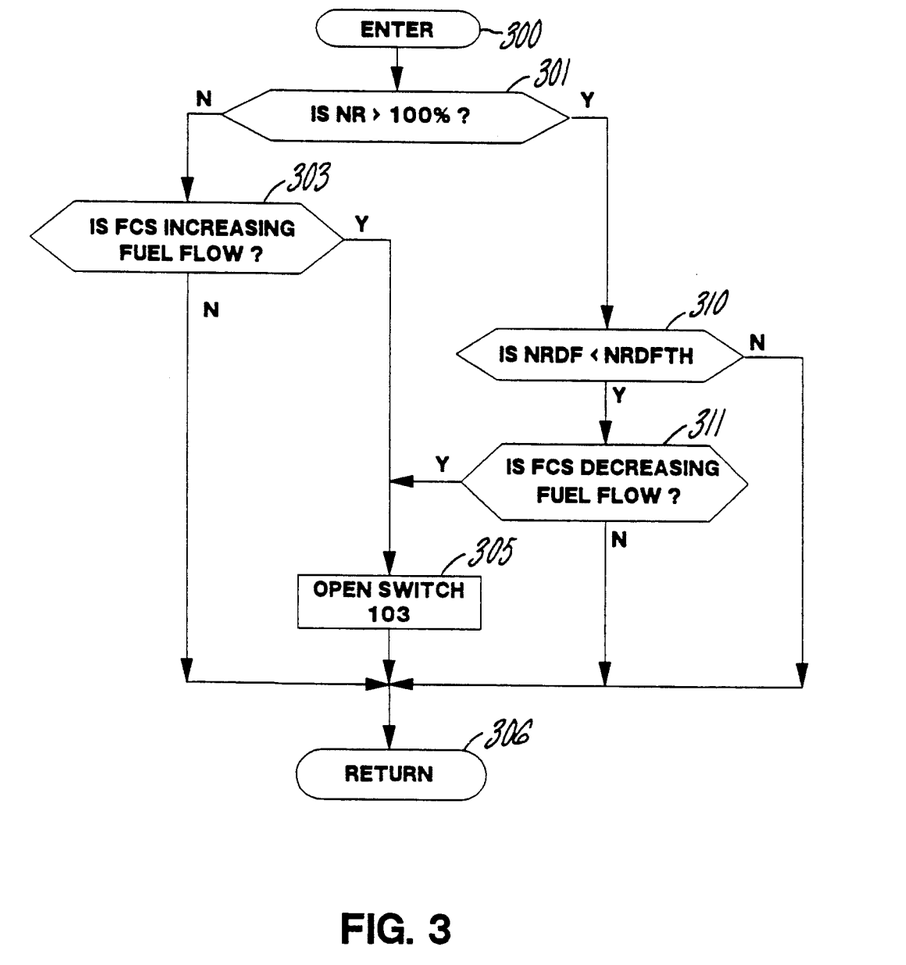
FIG. 3 is a simplified logic flow diagram of a routine for determining when to override fuel compensation in accordance with FIG. 2.

Compensation override of the present invention may be implemented using a simple computer program of the type illustrated in FIG. 3 herein, such routine being performable digitally by means of a UPROC of the type described herein. Referring to FIG. 3, the program is entered in a step 300, and the UPROC checks if rotor speed is less than a reference speed, e.g., 100 percent of rated speed, in a test 301. If the results of the test 301 are negative, the UPROC checks if the fuel compensation signal is increasing fuel flow to the helicopter's engine in a test 303. Positive results of the test 303 reach a step 305 wherein the switch 103 is opened. The subroutine then returns in a step 306. Therefore, the fuel compensation signal is overridden when it is adding fuel while main rotor speed is greater than or equal to the reference speed. If the results of the test 303 are negative, the subroutine returns in the step 306.

If rotor speed is less than the reference speed, the results of the test 301 are positive, and the UPROC checks if rotor acceleration is less than a threshold acceleration (NRDFTH) in a test 310. If the results of the test 310 are negative, the subroutine returns in the step 306. However, if the results of the test 310 are positive, the UPROC checks if the fuel control signal is decreasing fuel flow to the helicopter's engine in a test 311. If the results of the test 311 are positive, the step 305 is performed in which the fuel compensation signal is overridden. The subroutine then returns in the step 306. Therefore, if main rotor speed is below rated speed and main rotor acceleration is below the threshold acceleration, the fuel compensation signal is prevented from decreasing the fuel supplied to the helicopter's engine. If the results of the test 311 are negative, the subroutine returns in the step 306.

Figure 4:
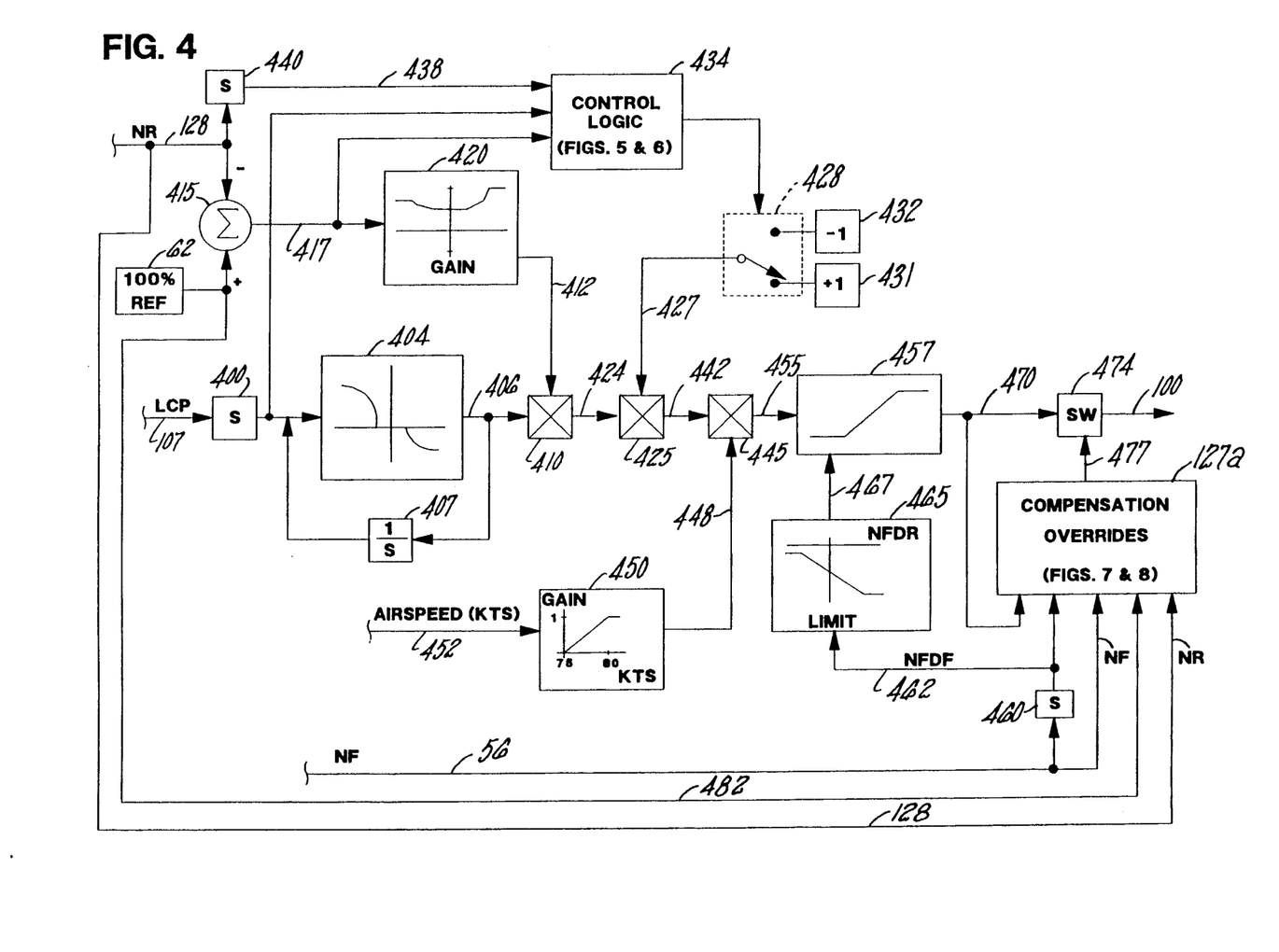
FIG. 4 is a simplified schematic block diagram of a second embodiment of the engine fuel control of the present invention.

A second embodiment of the lateral cyclic pitch anticipation portion 99 of the engine fuel control is shown in FIG. 4. The lateral cyclic pitch command signal (LCP) is provided on the line 107 to a differentiator 400 so as to provide a lateral cyclic pitch rate signal (LCPDF) on a line 402. LCPDF is in turn applied to a function generator or schedule 404 to thereby provide a corresponding output compensation signal on a line 406. The shape of the function generator characteristic is selected to provide the desired level of fuel compensation based on the rate of change in the lateral cyclic pitch command signal. The function generator characteristic may be provided with a threshold or deadband region wherein no compensation is provided corresponding to a LCPDF of a small magnitude.

The output of the function generator 404 is fed back to the input of the function generator via an integrator 407. A lateral cyclic pitch command signal that is of a large magnitude and rapidly applied may place a significant load on the engine, thereby providing the potential for large rotor droop or overspeed and the greatest need for lateral cyclic pitch anticipation. When the roll axis command is of a short duration, the feedback gain is used to "stretch out" the fuel compensation provided by the system for a longer period than would have occurred based on the output of the function generator 404 without feedback. Therefore, by using the feedback for the compensation signal, both the magnitude and duration of the fuel compensation is dependent upon LCPDF.

The fuel compensation signal is provided on the line 406 to a multiplication function 410 wherein the fuel compensation signal is multiplied by a main rotor speed error multiple on a line 412. Main rotor speed (NR) is provided on the line 128 to a summing junction 415 where it is subtracted from a signal indicative of 100% rated speed provided by the reference function 62. The output of the summing junction 415 is a main rotor speed error signal (NRERR) on a line 417. NRERR is indicative of the difference between main rotor speed and 100% rated engine speed. NRERR is provided on the line 417 to a gain function 420, the output of which is the engine speed error multiple on the line 412.

The output of the multiplication function 410 is provided on a line 424 to a second multiplication function 425. The other input to the multiplication function 425 is a gain signal on a line 427 provided via a switch 428, e.g., a software controlled switch, from either gain function 431 or gain function 432. The switch is controlled by control logic 434 which will be described in greater detail with respect to FIGS. 5 and 6. During normal operations, the switch provides a gain of +1 from gain function 431 to the line 427. However, under certain flight conditions, the switch 428 provides a gain of −1 from the gain function 432 to the line 427.

During normal flight conditions, right roll inputs result in a fuel compensation signal which reduces fuel flow to thereby prevent rotor overspeed. This is acceptable when rotor overspeed would occur without a preemptive fuel reduction. However, during a rapid right roll recovery, which is accompanied by rapid rotor/power turbine deceleration, additional fuel is required to prevent main rotor and engine droop. Therefore, the control logic 434 controls a switch 428 to invert the sign of the fuel compensation signal for right roll anticipation during roll recovery. The control logic 434 is responsive to LCPDF on the line 402, NRERR on the line 417, and a signal indicative of the rate of change of rotor speed (NRDF) on a line 438. NRDF is provided by applying NR on the line 128 to a differentiator 440.

Figure 5:
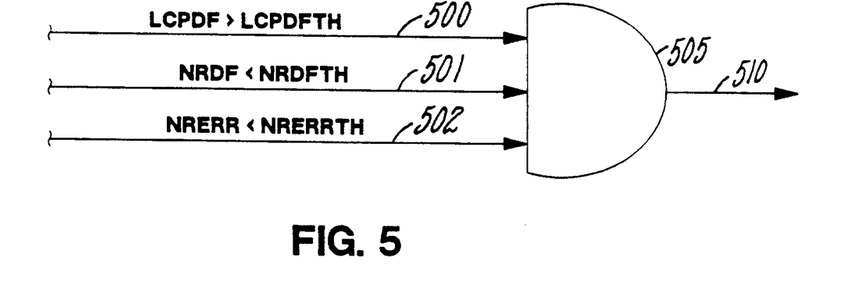
FIG. 5 is simplified logic diagram for determining the sign of the fuel compensation signal during right roll recovery in accordance with FIG. 4.

The control logic 434 for controlling the operation of the switch 428 is shown in FIG. 5. Referring to FIG. 5, if the roll rate command LCPDF exceeds a right roll rate command threshold (LCPDFTH) 500, and if the rate of change in main rotor speed exceeds a deceleration threshold (NRDFTH) 501, and if the rotor speed exceeds the engine reference speed by a threshold level (NRERRTH) 502 then the output of AND gate 505 is a logic 1 on a line 510 for activating switch 428 to provide a gain of −1 on the line 427. If any of the conditions checked by the AND gate 505 are not met, then the switch provides the gain of +1 to the line 427.

Figure 6:
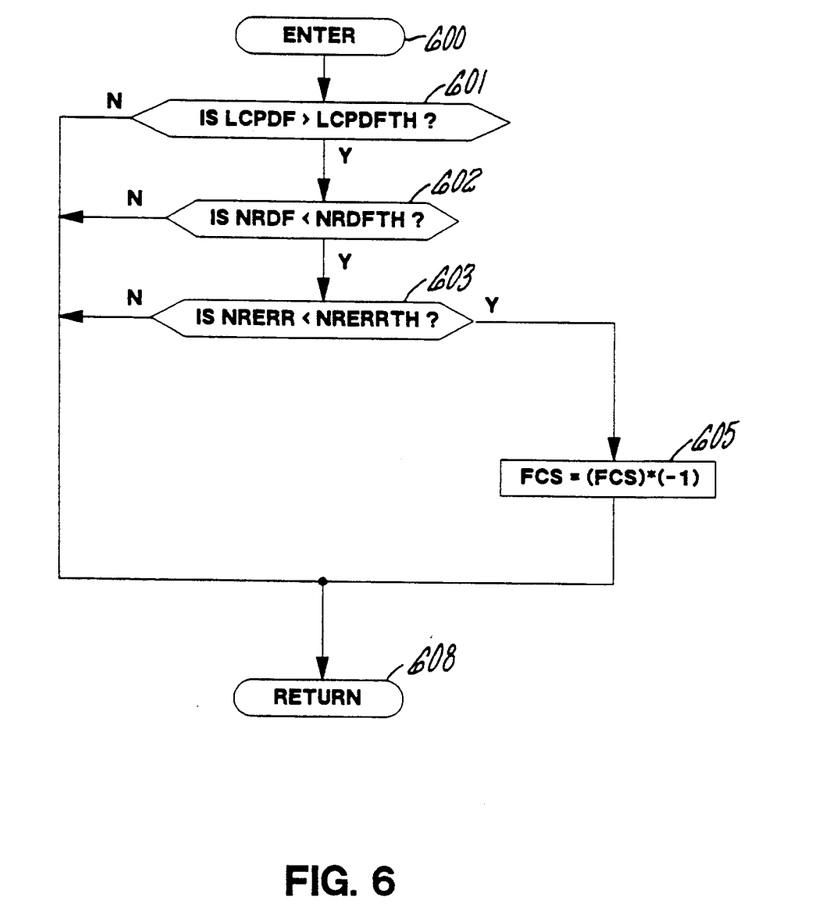
FIG. 6 is a simplified logic flow diagram of a routine for determining the sign of the fuel compensation signal in accordance with FIG. 5.

Although the switch control logic 434 of the engine fuel control of FIG. 4 is illustrated in terms of a digital logic gate in FIG. 5, it may be implemented very easily with a simple computer program of the type illustrated in FIG. 6. A routine of the type illustrated in FIG. 6 may be performed digitally by means of a microprocessor (UPROC) or it may be incorporated as a simple program change within a digital computerized automatic flight control system.

Referring to FIG. 6, the program is entered in a step 600, and the UPROC checks if LCPDF is greater than LCPDFTH in a test 601. If the results of this test 601 are positive, the UPROC checks if the rate of change in rotor speed exceeds an established deceleration threshold in a test 602. If the results of the test 602 are positive, the UPROC checks if engine speed error is less than NRERRTH in a test 603. If the results of the test 603 are positive, the conditions for inverting the sign of the fuel compensation signal are met, and the step 605 is performed wherein a gain of −1 is selected for inverting the sign of the fuel compensation signal. The subroutine then returns in a step 608. However, if the results of any one of the tests 601, 602 or 603 are negative, the conditions for inverting the sign of the fuel compensation signal are not met, and the subroutine returns in the step 608.

Returning to FIG. 4, the output of the multiplication function 425 is provided on a line 442 to a multiplication function 445 which multiplies the fuel compensation signal by an airspeed multiple on a line 448. The airspeed multiple is provided by an airspeed adjustment function 450 which is responsive to a signal indicative of airspeed on a line 452. It has been found that for low airspeeds, e.g., less than 75 knots, that lateral cyclic pitch anticipation is not required. Therefore, the magnitude of the airspeed adjustment multiple is determined as a function of airspeed. For airspeeds above a threshold magnitude, e.g., 80 knots, the magnitude of the airspeed multiple is equal to 1, and for airspeeds below the threshold magnitude, the magnitude of the airspeed multiple rapidly falls off to zero. Therefore, for low airspeeds, no fuel compensation is provided.

The output of the multiplication function 445 is provided on a line 455 to a limiter 457. The limiter 457 limits the magnitude of the fuel compensation signal. The upper limit of the limiter is fixed; however, the lower limit of the limiter is determined as a function of the rate of change in engine speed (NFDF). If engine speed is increasing, a large negative fuel compensation signal is allowed, and if engine speed is stable or decreasing, a proportionally small lower limit is used. This prevents excessive rotor and engine droop from a steady engine speed condition caused by too large of a lower limit, and excessive rotor and engine overspeed from an initial overspeed condition caused by too small of a lower limit. The engine speed signal (NF) is provided on the line 56 to a differentiator 460, the output of which is NFDF on a line 462. A limit function 465 is responsive to NFDF for providing the limiter 457 lower limit on a line 467.

The output of the limiter, i.e., the magnitude limited fuel compensation signal, is provided on a line 470 to a switch 474, e.g., a transistor switch. The fuel compensation signal on the line 470 is provided through the switch 474 to the line 100 unless there is a signal on a line 477 to activate the switch to an open position. The signal on the line 477 is provided by compensation override logic 127a of the engine fuel control when certain conditions are met as described in greater detail hereinafter with respect to FIGS. 7 and 8. The logic 127a is responsive to the engine speed signal (NF) on the line 56, NFDF on the line 462, the fuel compensation signal on the line 470, and the rotor speed signal (NR) on the line 128. The logic 127a is also responsive to the engine speed reference signal (NFREF) on a line 482 indicative of 100% of engine rated speed as provided by the engine speed reference function 62.

Figure 7:
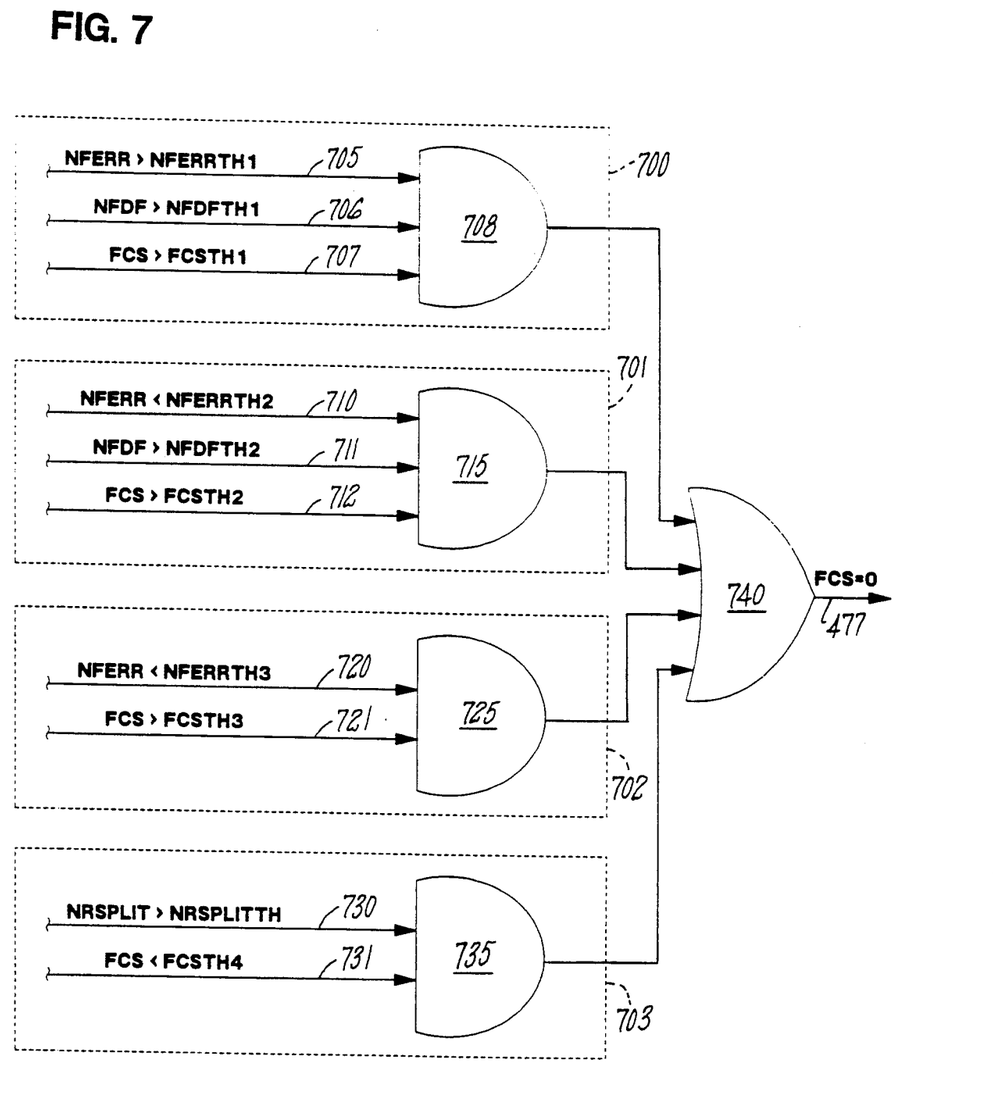
FIG. 7 is a simplified logic diagram for determining when to override fuel compensation in accordance with FIG. 4.

Referring to FIG. 7, the compensation override logic 127a contains four logic expressions which correspond to four different conditions in which the fuel compensation signal is overridden: during engine overspeed if engine speed is increasing and the fuel compensation signal is adding fuel 700; during engine overspeed if the primary fuel governor is adequately returning engine speed to its rated speed 701; during engine droop if the fuel compensation signal is removing fuel 702; and if the rotor decouples from the power turbine if the fuel compensation signal is removing fuel 703.

The first three override criteria in the second embodiment are dependent exclusively upon engine speed, and therefore can reside within the fuel control and not be dependent on aircraft originated signals such as main rotor speed. The difference between engine speed and engine reference speed is referred to as engine speed error (NFERR). If engine speed is greater than engine reference speed, then NFERR indicates that the engine is in an overspeed condition. If engine speed is less than engine reference speed, then NFERR indicates that the engine is in an underspeed or droop condition.

If NFERR is greater than a first overspeed threshold (NFERRTH1), NFDF is greater than a positive rate of change threshold (NFDFTH1) and FCS is greater than a first fuel compensation signal positive threshold (FCSTH1), a logic 1 is provided on signal lines 705, 706 and 707 respectively to a first AND gate 708. Similarly, if NFERR is less than a second overspeed threshold (NFERRTH2), NFDF is greater than a negative rate of change threshold (NFDFTH2) and FCS is greater than a second fuel compensation signal positive threshold (FCSTH2), a logic 1 is provided on signal lines 710, 711 and 712 respectively to a second AND gate 715. If NFERR is less than a droop threshold (NFERRTH3) and FCS is greater than a fuel compensation signal negative threshold (FCSTH3), a logic 1 is provided on signal lines 720 and 721 respectively to a third AND gate 725. Finally, if the difference between rotor speed and measured engine speed (NRSPLIT) is greater than an established split needle threshold (NRSPLITTH) and FCS is less than a fuel compensation signal negative threshold (FCSTH4), a logic 1 is provided on signal lines 730 and 731 respectively to a fourth AND gate 735. If the output of any one of the AND gates is a logic 1, the conditions for overriding the fuel compensation signal are met, and a signal is provided on the line 477 by OR gate 740 for activating the switch 474 (FIG. 4) to the open position.

Figure 8:
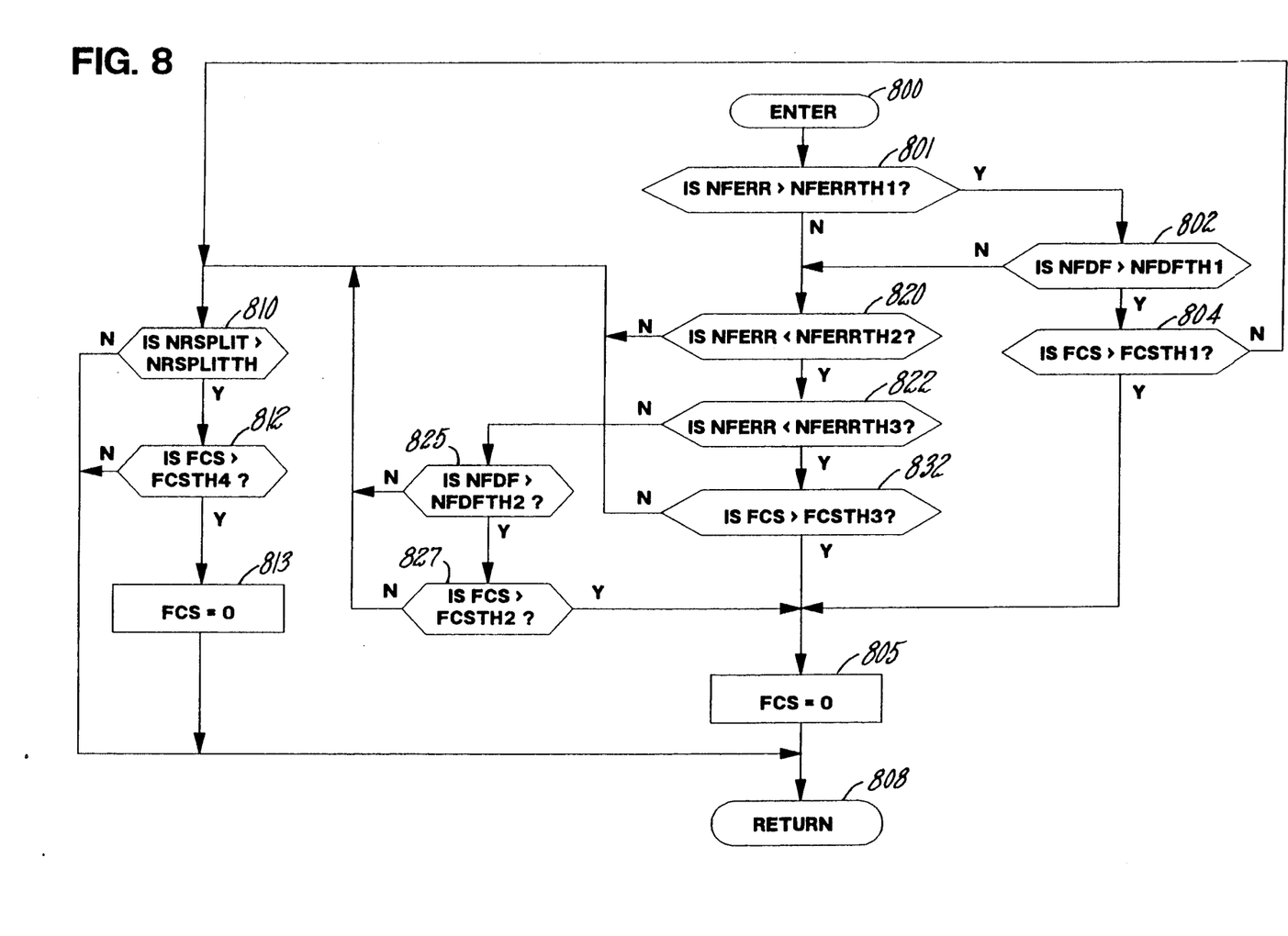
FIG. 8 is a simplified logic flow diagram of a routine for determining when to override fuel compensation in accordance with FIG. 7.

Although the compensation override logic 127a of the engine fuel control of FIG. 4 is illustrated in terms of digital logic gates in FIG. 7, it may be implemented very easily with a simple computer program of the type illustrated in FIG. 8 herein, such routine being performable digitally by means of a microprocessor (UPROC), or it may be incorporated as a simple program change within a digital, computerized automatic flight control system.

Referring to FIG. 8, the program is entered in a step 800, and the UPROC checks if NFERR is greater than NFERRTH1 in a test 801. If the results of the test 801 are positive, engine speed is greater than the first overspeed threshold, and a test 802 is performed wherein the UPROC checks if NFDF is greater than NFDFTH1. If the results of the test 802 are positive, engine speed is increasing above the positive rate of change threshold magnitude, and a test 804 is performed wherein the UPROC checks if FCS is greater than FCSTH1. If the results of the test 804 are positive, the fuel compensation signal is above a compensation threshold, and a step 805 is performed wherein the fuel compensation signal is set equal to zero. The subroutine then returns in a step 808.

If the results of the test 804 are negative, a test 810 is reached wherein the UPROC checks if NRSPLIT is greater than NRSPLITTH. If the results of the test 810 are positive, the rotor is decoupled from the engine, and the UPROC checks if FCS is greater than FCSTH4 in a test 812. If the results of the test 812 are positive, the fuel compensation signal is removing fuel above a threshold magnitude, and a step 813 is performed wherein the fuel compensation signal is set equal to zero. The subroutine then returns in the step 808. If the results of either of the tests 810 or 812 are negative, the conditions for overriding the fuel compensation signal are not met, and the subroutine returns in the step 808.

If the results of either the tests 801 or the test 802 are negative, the subroutine reaches a test 820 wherein the UPROC checks if NFERR is less than NFERRTH2. If the results of the test 820 are negative, the subroutine reaches the steps and tests 810 through 813. However, if the results of the test 820 are positive, a test 822 is performed wherein the UPROC checks if NFERR is less than NFERRTH3. If the results of the test 822 are negative, NFERR is between the second overspeed threshold and the droop threshold, and a test 825 is performed wherein the UPROC checks if NFDF is greater than NFDFTH2. If the results of the test 825 are positive, the engine speed is returning to rated speed, and a test 827 is performed wherein the UPROC checks if FCS is greater than FCSTH2. If the results of the test 827 are positive, the fuel compensation signal is above a compensation threshold, and the step 805 is performed wherein the fuel compensation signal is set equal to zero. The subroutine then returns in the step 808. If the results of either of the tests 825 or 827 are negative, the UPROC reaches the steps and tests 810 through 813.

If the results of the test 822 are positive, engine speed is below the droop threshold, and a test 832 is performed wherein the UPROC checks if FCS is greater than FCSTH3. If the results of the test 832 are positive, the fuel compensation signal is above a compensation threshold, and the step 805 is performed wherein the fuel compensation signal is set equal to zero. The subroutine then returns in the step 808. However, if the results of the test 832 are negative, the UPROC reaches the steps and tests 810 through 813.

Although not shown, the speed and lateral cyclic pitch command signals are preferably filtered in a suitable known way, and the derivative circuit (circuit 133) may have a low pass filter to reduce noise associated therewith. Although the invention is shown as being an add-on to an existing fuel control, it may be incorporated directly within the fuel control.

The lateral cyclic pitch compensation of the invention may be implemented with a computer program change to the program of a fuel control which is implemented digitally by means of a computer, or it may be incorporated as a program change within a digital, computerized automatic flight control system if desired. Of course, the invention could be implemented with dedicated digital or analog hardware.

The invention is described as it may be utilized with the fuel control of a free turbine gas engine. However, it may also be utilized with other types of engines, in an appropriate fashion which should be readily apparent to those skilled in the art in light of the description hereinbefore. Although the invention is described as controlling fuel flow to a helicopter engine, the invention may be used to control fuel flow to a plurality of engines, as is well known in the art.

The lateral cyclic pitch command signal is described as resulting from lateral movement of the cyclic pitch control stick, however, the signal may be provided in response to force applied to the cyclic pitch control stick, as is well known within the art. Additionally, it will be understood that any method of controlling a parameter, e.g., a twist grip, switch, dial, etc., may be used to provide the lateral cyclic pitch command signal in accordance with the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

We claim:

1. A helicopter comprising:
    a main rotor;
    an engine;
    rotor drive means including an overrunning clutch for connecting said main rotor to said engine whenever the speed of said main rotor does not exceed the speed of said engine;
    pilot operated cyclic pitch control means for changing the cyclic pitch of said main rotor;
    engine control means for providing a fuel command signal indicative of fuel flow required for desired engine operation, and for metering fuel flow to said engine in response to said fuel command signal;
    helicopter roll acceleration indicating means for providing a roll acceleration signal indicative of helicopter roll acceleration;
    lateral cyclic pitch control indicating means for providing a lateral cyclic pitch signal indicative of the amount of lateral cyclic pitch being commanded by said pilot operated cyclic pitch control means; and
    said engine control means comprising means for providing said fuel command signal with a lateral cyclic pitch component in response to said lateral cyclic pitch signal for increasing or decreasing fuel flow to said engine, the magnitude of said fuel command signal lateral cyclic pitch component being determined as a function of said roll acceleration signal.

2. A helicopter according to claim 1, further comprising:
    a lateral cyclic pitch control system responsive to said lateral cyclic pitch signal for controlling the total lateral cyclic pitch of said main rotor;

total lateral cyclic pitch control indicating means for providing a total lateral cyclic pitch signal indicative of the total lateral cyclic pitch of said main rotor; and said engine control means comprising means responsive to both said lateral cyclic pitch signal exceeding a right lateral cyclic pitch threshold magnitude or a left lateral cyclic pitch threshold magnitude, and said total lateral cyclic pitch signal exceeding a right total lateral cyclic pitch threshold magnitude or a left total lateral cyclic pitch threshold magnitude for providing said fuel command signal lateral cyclic pitch component.

3. A helicopter according to claim 1 wherein said engine control means further comprises means for providing an override signal for overriding said fuel command signal lateral cyclic pitch component.

4. A helicopter according to claim 1 further comprising limiting means for providing a first limit for limiting the magnitude of said fuel command signal lateral cyclic pitch component when it is increasing fuel flow to said engine, and for providing a second limit for limiting the magnitude of said fuel command signal lateral cyclic pitch component when it is decreasing the fuel flow to said engine.

5. A helicopter according to claim 1 further comprising limiting means for providing a first limit for limiting the magnitude of said fuel command signal lateral cyclic pitch component when it is increasing fuel flow to said engine, and for providing a second limit for limiting the magnitude of said fuel command signal lateral cyclic pitch component when it is decreasing the fuel flow to said engine.

6. A helicopter according to claim 3 further comprising:

rotor speed means for providing a rotor speed signal indicative of the rotary speed of said rotor; and said engine control means comprising means for providing said override signal in response to said rotor speed signal being in excess of a rotor speed threshold magnitude and said fuel command signal lateral cyclic pitch component increasing fuel flow to said engine.

7. A helicopter according to claim 6 further comprising:

rotor acceleration means for providing a rotor acceleration signal indicative of the positive or negative acceleration of said rotor; and said engine control means comprising means for providing said override signal in response to said rotor speed signal being below said rotor speed threshold magnitude, said rotor acceleration signal being indicative of negative acceleration and said fuel command signal lateral cyclic pitch component decreasing fuel flow to said engine.

8. A helicopter comprising:
a main rotor;
an engine;
rotor drive means including an overrunning clutch for connecting said main rotor to said engine whenever the speed of said main rotor does not exceed the speed of said engine;
pilot operated cyclic pitch control means for changing the cyclic pitch of said main rotor;
engine control means for providing a fuel command signal indicative of fuel flow required for desired engine operation, and for metering fuel flow to said engine in response to said fuel command signal;

means for providing a lateral cyclic pitch signal indicative of the amount of lateral cyclic pitch being commanded by said pilot operated cyclic pitch control means;

means responsive to said lateral cyclic pitch signal for providing a lateral cyclic pitch rate signal indicative of the rate of change of said lateral cyclic pitch signal;

means for providing a fuel compensation signal the magnitude and duration of which are dependent upon said lateral cyclic pitch rate signal; and said engine control means comprising means for combining said fuel compensation signal with said fuel command signal.

9. A helicopter according to claim 8 further comprising:

means for providing a rotor speed signal indicative of the rotary speed of said rotor;

means for providing an engine reference speed signal indicative of rated engine speed;

means for providing a rotor speed error multiple as a function of the difference between said rotor speed signal and said engine reference speed signal; and means for multiplying said fuel compensation signal by said rotor speed error multiple prior to combining said fuel compensation signal with said fuel command signal.

10. A helicopter according to claim 8 further comprising:

means for providing an air speed multiple as a function of helicopter; and means for multiplying said fuel compensation signal by said air speed multiple prior to combining said fuel compensation signal with said fuel command signal.

11. A helicopter according to claim 10 wherein said air speed multiple is set equal to zero when the airspeed of said helicopter is below a threshold magnitude.

12. A helicopter according to claim 8 wherein said engine control means further comprises means for providing an override signal for preventing the combination of said fuel compensation signal with said fuel command signal.

13. A helicopter according to claim 12 further comprising:

means for providing an engine speed signal indicative of the speed of said engine;

means for providing an engine acceleration signal indicative of the rate of change of said engine speed signal; and said override signal being provided in response to said engine speed signal being indicative of engine speed above a threshold magnitude, said engine acceleration signal being indicative of engine acceleration above a threshold magnitude, and said fuel compensation signal adding fuel; in response to said engine speed signal being indicative of engine speed above a threshold magnitude and said engine acceleration signal being indicative of engine deceleration; or in response to said engine speed signal being indicative of engine speed below a threshold magnitude and said fuel compensation signal removing fuel.

14. A helicopter according to claim 8 further comprising limiting means for providing a first limit for limiting the magnitude of said fuel compensation signal when it is increasing fuel flow to said engine, and for providing a second limit for limiting the magnitude of said fuel compensation signal when it is decreasing the fuel flow to said engine.

15. A helicopter according to claim 14 further comprising:

means for providing an engine speed signal indicative of the rate of change in engine speed; and said limiting means second limit being determined as a function of said engine speed signal.

* * * * *